Nov. 23, 1971  R. P. SPINELLO  3,621,577

DENTAL PROPHYLAXIS APPARATUS

Filed May 1, 1970

INVENTOR.
RONALD P. SPINELLO

BY
Eisenman & Strack

ATTORNEYS

United States Patent Office 3,621,577
Patented Nov. 23, 1971

3,621,577
DENTAL PROPHYLAXIS APPARATUS
Ronald P. Spinello, 372 Post Ave.,
Westbury, N.Y. 11590
Filed May 1, 1970, Ser. No. 33,770
Int. Cl. A61c *13/22*
U.S. Cl. 32—58
16 Claims

ABSTRACT OF THE DISCLOSURE

A dental prophylaxis device including a rotary, pliable tooth-engaging member of flexible material, onto the side wall of which is discharged, under the finger control of the dentist, a cleaning paste from the tip of a collapsible reservoir in the form of an expendable vial mounted on the nearby shank of the dental tool and having a contoured, flexible discharge tip which extrudes paste onto the tooth-engaging member when the reservoir is squeezed. The pliable member is preferably formed with paste-impelling surfaces which move the paste toward the tooth, and the tip of the vial maintains its proximity to the side wall of the pliable member both to continue the flow of paste to the tooth surface, and to preclude accumulations which result in splattering.

BACKGROUND OF THE INVENTION

This invention relates to dental prophylaxis apparatus and, in particular, to prepacked cleaning pumice in which the container or vial is attached to the power tool.

One of the most common techniques used by dentists for cleaning teeth involves the preparation of a slurry of pumice which is normally mixed in a pliable cup-shaped member and brought to the dental chair. The pumice is picked up on a small rotary rubber tip attached to a power-driven dental tool and then carried to the tooth where its abrasive action in conjunction with the rotating pliable tip performs the necessary cleaning function. The charge of cleaning pumice becomes progressively less effective as its particle size is milled down during the cleaning action. Pumice is also lost due to splattering which is annoying to both the patient and the dentist. Frequent interruption of the cleaning operation is required to replenish the pumice supply by dipping the polishing element into the nearby pumice cup.

Attempts have been made to render the cleaning process more efficient by providing automatic feeding devices for the pumice slurry. In most cases, these devices operate by providing a conduit or reservoir within the handpiece to feed pumice through the center axis of the rotating tooth-engaging tip. Such devices are relatively costly and tend to bring the pumice into contact with moving parts, such as the right-angle gears of the rotary tooth-cleaning element, and because the pumice is highly abrasive, excessive wear occurs in expensive parts. Also, in most such devices, the charge of pumice must be loaded manually into the handpiece, and the several parts must be cleaned and sterilized after each use because of contamination problems.

Accordingly, it is an object of the present invention to provide dental prophylaxis apparatus which overcomes the several disadvantages of related prior art devices by providing an expendable vial in which premixed pumice is packaged and from which it can be readily discharged by finger control of the dentist.

Another object of the present invention is to provide dental prophylaxis apparatus in which a continuous supply of pumice can be introduced to the rotary tooth-cleaning element of a dental tool and which, at the same time, inhibits splattering from the rotary element.

BRIEF DESCRIPTION OF THE INVENTION

In accordance with the present invention, there is provided dental prophylaxis apparatus adapted to be attached to and integrated with a conventional rotary handpiece in which the rotar ymember extends from the axis of the handpiece at right angles. A tooth-cleaning element in the form of a flexible rubber tip of cup-shaped configuration is attached to the rotary driver of the handpiece and an expendable vial of premixed cleaning compound, or pumice, is detachably mounted on the handpiece with a collapsible body portion or reservoir extending along the axis thereof where it can be squeezed by the dentist's fingers to extrude cleaning compound as needed. A flexible discharge tip extends from the reservoir outwardly at an angle to the shank of the hand tool to a point proximate the side wall of the flexible tooth-cleaning member, and also forms an angle to the axis of rotation thereof so that, as the rotating cleaning member is pressed against a tooth surface, causing it to expand or flare outwardly, the discharge tip of the vial can yield in compliance therewith, all the while maintaining engagement with the wall. The tip of the vial, which is also externally supported, is angled to engage the rubber cup on the far side of center, in the direction of rotation. The side wall of the cup is formed with impellers in the form of diagonal elements or grooves which, under the rotational forces, carry the discharged cleaning compound to the tooth surface. A buildup of pumice and saliva is prevented by the continuous proximity of the discharge tip to the side wall of the rotating cleaning member, thus preventing splattering.

DESCRIPTION OF THE PREFERRED EMBODIMENT

Figure 1:
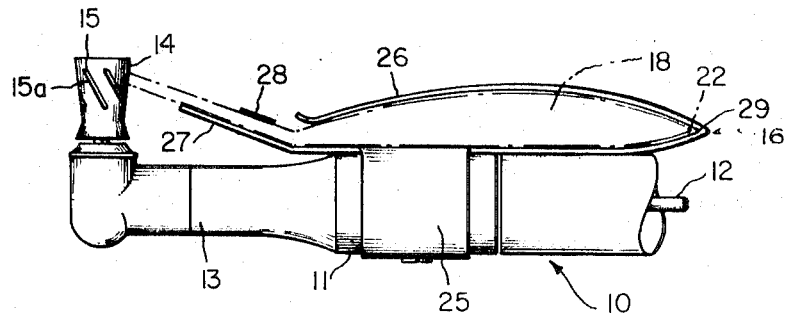
FIG. 1 is a side view of the handpiece of a dental tool showing tooth-cleaning apparatus in accordance with the invention attached thereto.
Figure 2:
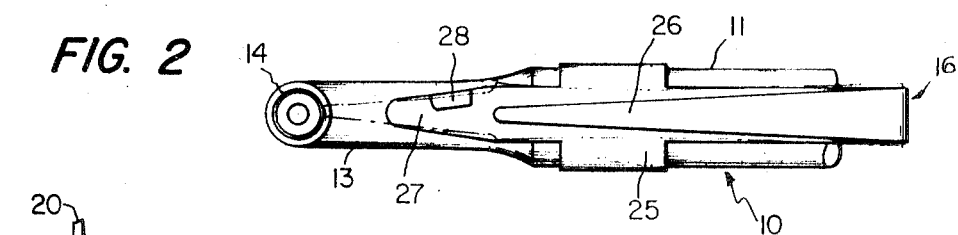
FIG. 2 is a top view of the assembly of FIG. 1.

Referring to the drawings, the invention is illustrated as embodied in a dental prophylaxis assembly which can be integrated with a conventional dental power tool 10 having a shank or hand-holding portion 11. The inner end of the tool is adapted to be coupled to a rotary power source 12 through a conventional flexible coupling, and the outer end carries a detachable rotary head 13, the working end of which extends at angles to the axis of the shank. Detachably secured to the rotary head is a tooth-engaging and cleaning member in the form of a pliable cup 14 formed, for example, of rubber or plastic.

The cup 14 is formed on its cylindrical outer surface with pumice-impelling elements 15 which can take the form, for example, of inclined grooves which define shoulders 15a. The impeller elements 15 are inclined relative to the indicated direction of rotation to move the pumice or cleaning compound toward the outer or working edge of the cup.

Figure 3A:
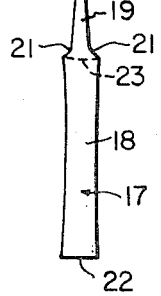
FIGS. 3A and 3B are side and plan views of the expendable pumice vial which is used in the assembly of FIGS. 1 and 2.
Figure 3B:
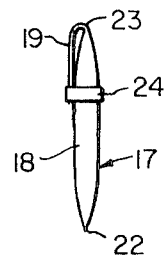

Attached to the handpiece 11 is a mounting member 16 for holding an expendable vial 17 containing a premixed and prepackaged pumice slurry. As best seen in FIGS. 3A and 3B, the vial 17 includes a collapsible body or reservoir portion 18 and a flexible discharge conduit 19 having a contoured discharge tip 20. FIG. 3B shows the vial as it is packaged for shipping in a folded condition and FIG. 3A shows the unfolded configuration with the foldline shown in a broken line 23. The vial at the forward end of the reservoir is formed with shoulders 21 which are a predetermined, measured distance from the squared-off base end 22. The vial 17 is packaged with the discharge conduit 19 empty or free of the pumice slurry and folded back upon the body portion along the fold-line 23 adjacent the shoulders 21 to form a closure, and is held in place against the body portion by destroyable sealing ring 24 which also preserves the tip in sterile condition.

Figure 4A:
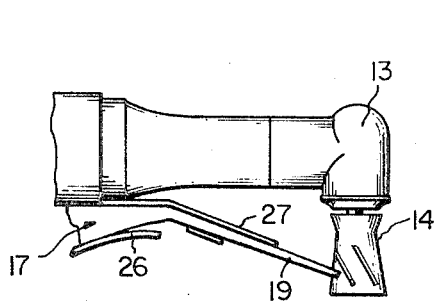
FIGS. 4A and 4B are enlarged side views showing the relation between the discharge tip of the vial and the tooth-engaging member.
Figure 5A:
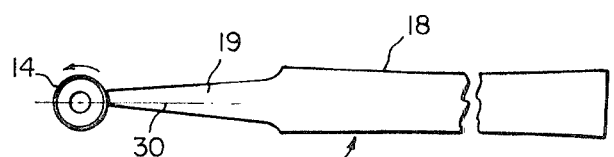
FIGS. 5A and 5B are enlarged end views corresponding to FIGS. 4A and 4B respectively.
Figure 5B:
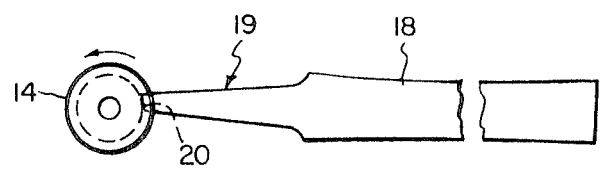

The mounting member 16 includes a base 25 formed integrally with an upper spring or clamping finger 26 and also with a forward, resilient guide finger 27. A clamping and positioning member 28 is also carried at the forward end of the assembly to receive the vial 17 at its shoulder 21 and to overlie the fold-line 23 of the vial to cause the discharge conduit 19 to lie upon the guide finger 27. The location of the positioning member 28 in relation to the base 29 is such that the base 22 of the vial seats against the base 29 of the holding assembly with the member 28 nesting within the shoulder 21, thereby to precisely position the vial with the discharge tip 20 closely adjacent the side wall of the pliable cup 14, as best seen in FIGS. 4A and B and 5A and B. It will also be observed that the inclined leading edge of the discharge tip 20 engages the wall of the cup primarily in the quadrant which is beyond the central axis 30 of the hand tool 10, in the direction of cup rotation.

In operation, as best seen in FIGS. 4A, 4B, 5A and 5B, the operator first expresses a small amount of pumice onto the wall of the cup 14 by pressing the clamping finger 26, the pumice thereby being squeezed from the reservoir portion through the discharge conduit. As the cup 14 rotates, this discharge of pumice is carried to the working or tooth-engaging edge of the tip under the forces generated by the impelling elements 15a. As the pliable cup is pressed against the tooth under the control of the operator, the pumice and the cup perform the cleaning operation on the tooth surface in a conventional manner. It will be observed, however, that the discharge conduit 19 is positioned close to the point at which the cup flares or flexes outwardly under the pressure of the cleaning operation. The discharge conduit accommodates distortion of the cup member without losing contact therewith by flexing away from the tooth surface. This continuing contact serves not only to enable the discharge conduit to deposit additional pumice onto the surface without interruption, but also enables the conduit to break down saliva accumulations which in mixture with the pumice tend to cause splattering. As additional pumice is deposited on the cup, whether it be distorted or not, it will be continuously urged to the working edge of the cup by the combined action of the tip 20 of the discharge conduit 19, the impeller elements 15a, and the inclination or flare of the surface of the pliable cup 14.

The capacity of the expendable vial 17 is sufficient for one treatment so that it can be discarded after use. Because one vial is used for each treatment and because each vial is individually sealed, it is possible for a dentist to stock a variety of cleaning compounds of different textures and flavors without requiring that a corresponding variety of master jars of compound be kept in partially used condition on the shelf which can result in drying out.

While the invention has been described above in conjunction with the embodiment illustrated in the drawing, it will be understood that it can take various shapes and forms within the scope of the invention. Thus, for example, mounting member 16 can be made adjustable on the shank of the handpiece 10 by suitable clamping means to accommodate differently dimensioned vials of cleaning compound or different cup or tool shapes and sizes. Also, the mounting member can be more fully integrated into the handpiece, provided, however, that suitable positioning shoulders and finger-actuated compressing members are included. Also, while the cup is shown as being rotatable on an axis 90° to the axis of the shank of the tool, other angles such as 45°, can be used. The invention should not, therefore, be regarded as limited except as defined in the following claims.

I claim:

1. Dental prophylaxis apparatus comprising a handpiece adapted to be attached to a rotary power source including a shank portion, a driving head on the end thereof and at angles to the shank, a pliable tooth-engaging rotary cleaning member of circular cross-section attached to the driving head and having walls which spread radially outwardly as the cleaning member is compressed against a tooth surface, a reservoir of tooth-cleaning compound carried by the shank portion, a flexible discharge conduit attached to the reservoir and having a tip portion engaging the outer side wall of the cleaning member at a point spaced from the tooth-engaging surface thereof, and means to extrude cleaning compound from the reservoir to the cleaning member, whereby the tip portion of said discharge conduit remains in contact with the side wall of the cleaning member at all times to form a barrier to the migration of cleaning compound rearwardly toward the driving head.

2. Apparatus as set forth in claim 1, said reservoir and hollow discharge conduit being formed as an integrated expendable vial and means to releasably attach the vial to the side of the dental tool adjacent the working, free end thereof.

3. Apparatus as set forth in claim 2, said vial including a collapsible reservoir portion.

4. Apparatus as set forth in claim 2, said vial being formed with forwardly and rearwardly facing shoulders, and means carried by the shank portion of the tool to secure the vial in an axially and laterally stabilized position with the discharge conduit in engagement with the cleaning member.

5. Apparatus as set forth in claim 1, said discharge conduit having its tip in engagement with the pliable tooth-engaging member predominantly on one side of the plane containing the axes of the shank and pliable members.

6. Apparatus as set forth in claim 5, said tip of the discharge conduit being broadened in the direction of rotary motion of the tooth-engaging member and contoured to engage the side wall thereof.

7. Apparatus as set forth in claim 1, including impeller means on the lateral surface of the cleaning member to urge cleaning compound toward the tooth-engaging end thereof.

8. Apparatus as set forth in claim 7, said impeller means comprising inclined grooves formed on the side wall of the tooth-engaging member.

9. Apparatus as set forth in claim 2, including a first spring finger resiliently underlying a substantial portion of the flexible discharge conduit and directing the discharge at an angle to the axis of rotation of the tooth-engaging member.

10. Apparatus as set forth in claim 9, said reservoir being collapsible, and a second spring finger carried by the shank to engage the collapsible reservoir to express cleaning compound therefrom under finger pressure from the operator.

11. Apparatus as set forth in claim 10, said first and second spring fingers being formed as an integral piece joined at the base end to define a shoulder to be engaged by the base of the reservoir to position the vial with its discharge conduit in engagement with the tooth-engaging member.

12. Apparatus as set forth in claim 9, including means carried by the first spring finger to engage the side of the vial to position the discharge conduit with its end disposed against the side of the rotary tooth-engaging member which moves away from the end during rotation.

13. Apparatus as set forth in claim 11, including means to adjustably and detachably secure said spring fingers as a unit on the shank portion.

14. A tooth-cleaning member comprising a flexible pliable cup adapted to be attached to a rotary driving member for rotation about its central axis with the lip or touch engaging surface of the cup being adapted to be brought into engagement with tooth surfaces to flare outwardly under pressure applied by the operator in the direction of the axis of rotation, and impeller members in the form of no on the outside wall of the cup member to urge cleaning compound toward the lip or touch engaging surface under rotation.

15. A tooth-cleaning member as set forth in claim 14, said impeller members comprising inclined grooves formed in the side wall.

16. Dental prophylaxis apparatus comprising a handpiece adapted to be attached to a rotary power source including a shank portion, a driving head on the end thereof and at angles to the shank, a pliable tooth-engaging rotary cleaning member attached to the driving head and having walls which spread radially outwardly as the cleaning member is compressed against a tooth surface, and a flexible finger carried by the handpiece and having a tip portion engaging the outer side wall of the cleaning member at a point spaced from the tooth-engaging surface thereof to form a barrier to the migration of cleaning compound rearwardly toward the driving head.

References Cited
UNITED STATES PATENTS

| | | | |
|---|---|---|---|
| 2,738,528 | 3/1956 | Fridge, Sr. | 15—97 |
| 3,091,033 | 5/1963 | Ellman | 32—58 |

ROBERT PESHOCK, Primary Examiner

UNITED STATES PATENT OFFICE
CERTIFICATE OF CORRECTION

Patent No. 3,621,577         Dated November 23, 1971

Inventor(s)     RONALD P. SPINELLO

It is certified that error appears in the above-identified patent and that said Letters Patent are hereby corrected as shown below:

Col. 1, line 30, change "prepacked" to --prepackaged--

Col. 2, line  5, change "rotar ymember" to --rotary member--

Col. 5, line  5 (claim 14), change "touch" to --tooth--

Col. 5, line 11 ( "    14), after "form of", change "no" to --ribs--

Col. 5, line 12 ( "    14), change "touch" to --tooth--.

Signed and sealed this 15th day of August 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,621,577　　　　　　　　　Dated　November 23, 1971

Inventor(s)　Ronald P. Spinello

Figure 4B:
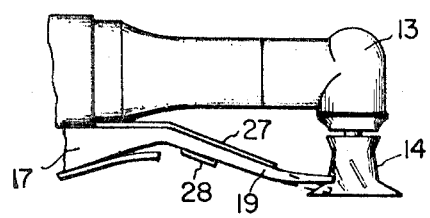

It is certified that error appears in the above-identified patent and that said Letters Patent are hereby corrected as shown below:

Figures 4A and 4B are to be shown as follows:

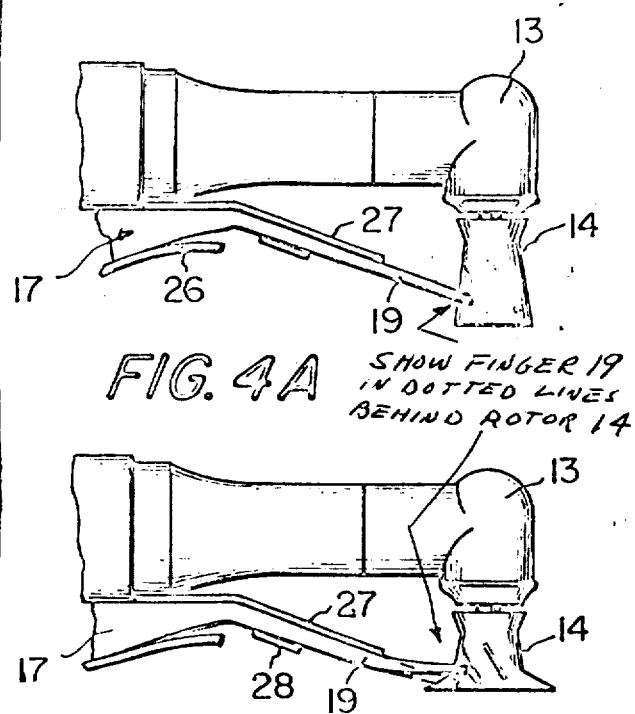

SHOW FINGER 19 IN DOTTED LINES BEHIND ROTOR 14

Signed and sealed this 6th day of February 1973.

(SEAL)
Attest:

EDWARD M. FLETCHER, JR.
Attesting Officer

ROBERT GOTTSCHALK
Commissioner of Patents